(12) United States Patent
Sheppard et al.

(10) Patent No.: US 10,890,389 B2
(45) Date of Patent: *Jan. 12, 2021

(54) HEAT EXCHANGER ASSEMBLIES WITH INTEGRATED VALVE

(71) Applicant: Dana Canada Corporation, Oakville (CA)

(72) Inventors: Jeff Sheppard, Milton (CA); Dario Bettio, Mississauga (CA); Sachin Bhatia, Mississauga (CA)

(73) Assignee: Dana Canada Corporation, Oakville (CA)

( * ) Notice: Subject to any disclaimer, the term of this patent is extended or adjusted under 35 U.S.C. 154(b) by 24 days.

This patent is subject to a terminal disclaimer.

(21) Appl. No.: 16/214,952

(22) Filed: Dec. 10, 2018

(65) Prior Publication Data

US 2019/0107345 A1 Apr. 11, 2019

Related U.S. Application Data

(60) Continuation of application No. 15/919,978, filed on Mar. 13, 2018, now Pat. No. 10,184,735, which is a (Continued)

(51) Int. Cl.
*F28F 27/00* (2006.01)
*F28D 9/00* (2006.01)
(Continued)

(52) U.S. Cl.
CPC .............. *F28F 27/00* (2013.01); *F28D 9/005* (2013.01); *F28F 27/02* (2013.01); *F01P 7/16* (2013.01);
(Continued)

(58) Field of Classification Search
CPC ........ F28F 27/00; F28F 27/02; F28F 2250/06; F28F 2280/06; F28D 9/005; F28D 2021/0089; F01P 7/16; G05D 23/02
(Continued)

(56) References Cited

U.S. PATENT DOCUMENTS

| 208,986 A | 10/1878 | Patterson |
| 290,450 A | 12/1883 | Medden |

(Continued)

FOREIGN PATENT DOCUMENTS

| DE | 1069650 A | 11/1959 |
| DE | 102008029958 A1 | 12/2009 |

(Continued)

OTHER PUBLICATIONS

Crane Catalogue, Section 2, Bronze Valves, pp. 2-27 and 2-29, May 1961.
(Continued)

*Primary Examiner* — Joel M Attey
(74) *Attorney, Agent, or Firm* — Ridout & Maybee LLP

(57) ABSTRACT

Various ways to integrate control valves into the structure of a heat exchanger are disclosed. The present disclosure relates to a heat exchanger assembly that includes a heat exchanger and a valve integration unit. The heat exchanger includes a plurality of alternating first and second fluid passages in heat exchange relation, and at least one inlet manifold and one outlet manifold interconnected by one of the plurality of first or second fluid passages. The valve integration unit is fixedly attached to heat exchanger and includes a fluid passage in fluid communication with at least one of the inlet and outlet manifolds. A valve mechanism is mounted within the valve integration unit in fluid commu-
(Continued)

nication with the fluid passage, the valve mechanism controlling the flow of a heat exchange fluid through the fluid passage.

22 Claims, 12 Drawing Sheets

Related U.S. Application Data division of application No. 13/905,195, filed on May 30, 2013, now Pat. No. 9,945,623.

(60) Provisional application No. 61/653,565, filed on May 31, 2012.

(51) Int. Cl.
*F28F 27/02* (2006.01)
*F28B 1/02* (2006.01)
*F01P 7/16* (2006.01)
*G05D 23/02* (2006.01)
*F28D 21/00* (2006.01)

(52) U.S. Cl.
CPC ........ *F28B 1/02* (2013.01); *F28D 2021/0089* (2013.01); *F28F 2250/06* (2013.01); *F28F 2280/06* (2013.01); *G05D 23/02* (2013.01)

(58) Field of Classification Search
USPC ....................................................... 165/297
See application file for complete search history.

(56) References Cited

U.S. PATENT DOCUMENTS

| | | |
|---|---|---|
| 320,280 A | 6/1885 | Pearson |
| 417,136 A | 12/1889 | Bell |
| 424,199 A | 3/1890 | Haskell |
| 674,674 A | 5/1901 | Fernald |
| 809,603 A | 1/1906 | Barr |
| 967,820 A | 8/1910 | Nachtigall |
| 1,457,937 A | 6/1923 | Reynolds |
| 1,648,124 A | 11/1927 | Hopkins |
| 1,740,420 A | 12/1929 | Friedman |
| 1,807,594 A | 6/1931 | Hopkins |
| 1,843,953 A | 2/1932 | McKinney |
| 1,937,246 A | 11/1933 | Reedy |
| 1,939,128 A | 12/1933 | Meyer |
| 1,942,417 A | 1/1934 | Ferlin |
| 1,991,052 A | 2/1935 | Derby |
| 2,159,468 A | 5/1939 | Young |
| 2,396,053 A | 3/1946 | McEntire |
| 2,433,454 A | 12/1947 | Hoffman |
| 2,469,212 A | 5/1949 | Shaw |
| 2,865,594 A | 12/1958 | Winfree |
| 3,034,571 A | 5/1962 | Matthews |
| 3,145,968 A | 8/1964 | Marx |
| 3,155,367 A | 11/1964 | Gifford |
| 3,282,554 A | 11/1966 | Jones |
| 3,404,837 A | 10/1968 | James |
| 3,412,756 A | 11/1968 | Shore |
| 3,414,232 A | 12/1968 | Hellman |
| 3,440,833 A | 4/1969 | Fernandes |
| 3,519,245 A | 7/1970 | Hyde |
| 3,558,098 A | 1/1971 | Puster |
| 3,572,631 A | 3/1971 | Ritchart |
| 3,754,706 A | 8/1973 | Tao |
| 3,779,306 A | 12/1973 | Wilson |
| 3,926,204 A | 12/1975 | Earl |
| 3,943,970 A | 3/1976 | Knapp |
| 3,952,764 A | 4/1976 | Keller, III |
| 4,024,909 A | 5/1977 | Hofmann, Jr. |
| 4,056,119 A | 11/1977 | Allen |
| 4,089,504 A | 5/1978 | Giuliani |
| 4,114,571 A | 9/1978 | Ruf |
| 4,469,275 A | 9/1984 | Desalve |
| 4,508,132 A | 4/1985 | Mayfield, Jr. |
| 4,527,681 A | 7/1985 | Sommer |
| 4,550,896 A | 11/1985 | Hansen, III |
| 4,574,836 A | 3/1986 | Barnard, Jr. |
| 4,669,532 A | 6/1987 | Tejima |
| 4,759,331 A | 7/1988 | Sausner |
| 4,846,219 A | 7/1989 | Schaefer |
| 5,085,468 A | 2/1992 | Billotte |
| 5,108,071 A | 4/1992 | Hutchings |
| 5,217,200 A | 6/1993 | Hutchings |
| 5,303,734 A | 4/1994 | Eidsmore |
| 5,401,087 A | 3/1995 | Goossens |
| 5,423,373 A | 6/1995 | Ramberg |
| 5,425,397 A | 6/1995 | Mackal |
| 5,474,107 A | 12/1995 | Hayes |
| 5,551,506 A | 9/1996 | Nishishita |
| 5,553,664 A | 9/1996 | Nishishita |
| 5,609,203 A | 3/1997 | Kinugasa |
| 5,687,756 A | 11/1997 | Vannatta |
| 5,694,975 A | 12/1997 | Eidsmore |
| 5,875,834 A | 3/1999 | Brooks |
| 5,904,292 A | 5/1999 | McIntosh |
| 5,950,589 A | 9/1999 | Armbruster |
| 5,964,282 A | 10/1999 | Seiler |
| 5,988,265 A | 11/1999 | Marthaler |
| 6,161,614 A | 12/2000 | Woodhull, Jr. |
| 6,182,749 B1 | 2/2001 | Brost |
| 6,253,837 B1 | 7/2001 | Seiler |
| 6,302,191 B1 | 10/2001 | Wickham |
| 6,401,670 B2 | 6/2002 | Frunzetti |
| 6,505,812 B1 | 1/2003 | Anastas |
| 6,533,242 B2 | 3/2003 | Geib |
| 6,659,050 B1 | 12/2003 | Creech |
| 6,772,958 B1 | 8/2004 | Lamb |
| 6,793,198 B2 | 9/2004 | Robison |
| 6,799,631 B2 | 10/2004 | Acre |
| 6,810,931 B2 | 11/2004 | Graffin |
| 6,886,597 B2 | 5/2005 | Dragoni |
| 7,178,553 B2 | 2/2007 | Peric |
| 7,487,826 B2 | 2/2009 | Pineo |
| 7,490,622 B2 | 2/2009 | Jones |
| 7,490,662 B2 | 2/2009 | Eliades |
| 7,617,700 B2 | 11/2009 | Lamb |
| 7,735,520 B2 | 6/2010 | Peric |
| 7,748,442 B2 | 7/2010 | Kalbacher |
| 7,854,256 B2 | 12/2010 | Pineo |
| 8,919,299 B2 | 12/2014 | Potter |
| 9,188,055 B2 | 11/2015 | Potter |
| 9,360,262 B2 | 6/2016 | Kim |
| 9,921,005 B2 | 3/2018 | Bluetling et al. |
| 2002/0005179 A1* | 1/2002 | Frunzetti ................. F28F 27/02 123/41.31 |
| 2003/0019620 A1 | 1/2003 | Pineo |
| 2003/0062493 A1 | 4/2003 | Lin |
| 2003/0197142 A1 | 10/2003 | Tawns |
| 2005/0205236 A1* | 9/2005 | Kalbacher .............. F01M 5/002 165/11.1 |
| 2007/0084809 A1 | 4/2007 | Bradu |
| 2008/0110605 A1 | 5/2008 | Richter |
| 2009/0025922 A1* | 1/2009 | Strzelczyk ........... G05D 23/022 165/297 |
| 2011/0042060 A1 | 2/2011 | Pineo |
| 2011/0155358 A1 | 6/2011 | Galahroudi et al. |
| 2012/0102952 A1 | 5/2012 | Spohn et al. |

FOREIGN PATENT DOCUMENTS

| | | |
|---|---|---|
| DE | 202011002197 U1 | 3/2012 |
| DE | 102011116923 A1 | 5/2012 |
| EP | 1719959 A2 | 11/2006 |
| EP | 1611320 B1 | 12/2010 |

(56) References Cited

FOREIGN PATENT DOCUMENTS

JP         379637 B2   12/1991
WO    2004092552 A2   10/2004

OTHER PUBLICATIONS

ISA Handbook of Control Valves, 2nd Edition, pp. 14-15, Jun. 1, 1976.
Parker Fluid Connectors, Rising Stem Plug Valve, p. 13, Jul. 1994.
The People'S Republic of China, Chinese Search Report with written opinion issued in Application 201380028926.5, 13 pages, The State Intellectual Property Office of the People's Republic of China, Shanghai, China.
Canadian Intellectual Property Office, International Search Report with written opinion issued in PCT/CA2013/050417, dated Jul. 24, 2013, 10 pages, Canadian Intellectual Property Office, Quebec, Canada.
English Machine Translation of WO 2004/092552 A2 Oct 28, 2028.
English Machine Translation of DE 1069650A Nov 26, 2009.

* cited by examiner

US 10,890,389 B2

HEAT EXCHANGER ASSEMBLIES WITH INTEGRATED VALVE

CROSS-REFERENCE TO RELATED APPLICATIONS

This application is a continuation of U.S. patent application Ser. No. 15/919,978 filed Mar. 13, 2018, which is a divisional of U.S. patent application Ser. No. 13/905,195 filed May 30, 2013, now U.S. Pat. No. 9,945,623, which claims priority to and the benefit of U.S. Provisional Patent Application No. 61/653,565, filed May 31, 2012 under the title HEAT EXCHANGER ASSEMBLIES WITH INTEGRATED VALVE. The content of the above patent applications is hereby expressly incorporated by reference into the detailed description of the present application.

TECHNICAL FIELD

Various heat exchanger assemblies with a valve mechanism, such as a control valve or thermal bypass valve, integrated into the structure of a heat exchanger are disclosed.

BACKGROUND

In the automobile industry, for example, control valves and/or thermal valves are often used in combination with heat exchangers to either direct a fluid to a heat exchanger unit to be cooled/heated, or to direct the fluid elsewhere in the fluid circuit within the automobile system so as to "bypass" the heat exchanger. Control valves or thermal valves are also used within automobile systems to sense the temperature of a particular fluid and direct it to an appropriate heat exchanger, for either warming or cooling, to ensure the fluids circuiting through the automobile systems are within desired temperature ranges.

Traditionally, control valves or thermal bypass valves have been incorporated into a heat exchange system by means of external fluid lines that are connected to an inlet/outlet of a heat exchanger, the control valves being separate to the heat exchanger and being connected either upstream or downstream from the heat exchanger within the external fluid lines. These types of fluid connections require various parts/components which increase the number of individual fluid connections in the overall heat exchange system. This not only adds to the overall costs associated with the system, but also gives rise to multiple potential points of failure and/or leakage. Size constraints are also a factor within the automobile industry with a trend towards more compact units or component structures.

Accordingly, there is a need, for improved heat exchanger assemblies that can offer improved connections between the control valves and the associated heat exchanger, and that can also result in more compact, overall assemblies.

SUMMARY OF THE PRESENT DISCLOSURE

According to one aspect of the present disclosure there is provided a heat exchanger assembly comprising: a heat exchanger having alternating first and second fluid passages in heat exchange relation; a first inlet manifold and a first outlet manifold interconnected by the first fluid passages for the flow of a first heat exchange fluid through the heat exchanger; and a second inlet manifold and a second outlet manifold interconnected by the second fluid passages for the flow of a second heat exchange fluid through the heat exchanger; a manifold structure fixedly attached to the heat exchanger and in fluid communication with the first inlet and outlet manifolds of the heat exchanger, the manifold structure comprising: a first internal fluid channel for directing the first heat exchange fluid to the first inlet manifold of said heat exchanger; a second internal fluid channel for directing the first heat exchange fluid away from said inlet manifold of said heat exchanger; an internal valve cavity in fluid communication with the first outlet manifold of said heat exchanger and the second internal fluid channel; a valve mechanism disposed within the internal valve cavity for controlling flow of the first heat exchanger fluid to either said heat exchanger or to said second internal fluid channel; and a first pair of inlet and outlet ports for receiving the first heat exchange fluid from a source and returning said first heat exchange fluid to said source; a second pair of inlet and outlet ports in fluid communication with the corresponding, respective first inlet and outlet manifolds in said heat exchanger; and a third pair of inlet and outlet ports for directing said first heat exchange fluid out of said manifold structure and returning said first heat exchange fluid to said manifold structure; wherein the first internal fluid channel interconnects said first inlet port and said first inlet manifold of said heat exchanger, and the second internal fluid channel interconnects said first inlet port and said third outlet port; and wherein the manifold structure further comprises a third internal fluid channel which interconnects said third inlet port and said first outlet port via said internal valve cavity.

BRIEF DESCRIPTION OF THE DRAWINGS

Exemplary embodiments of the present disclosure will now be described, by way of example, with reference to the accompanying drawings, in which.

DETAILED DESCRIPTION OF EXEMPLARY EMBODIMENTS

Figure 1:
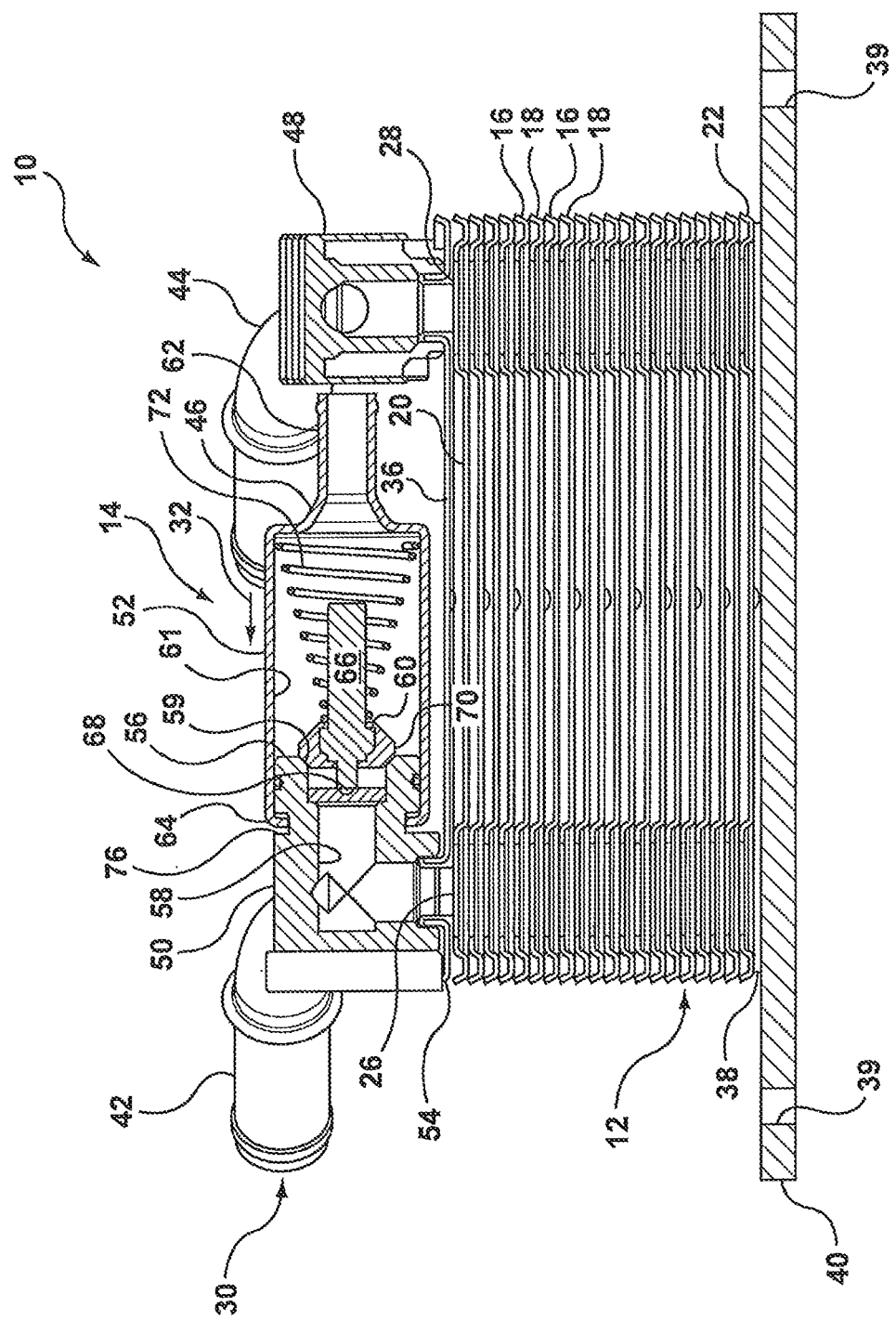
FIG. 1 is a schematic, sectional view of a heat exchanger assembly with an integrated valve structure.

Referring now to FIG. 1, there is shown an exemplary embodiment of a heat exchanger assembly 10 according to the present disclosure. Heat exchanger assembly 10 is comprised of a heat exchanger 12 with an integrated control valve or valve assembly 14. Heat exchanger 12 is generally in the form of a nested, dished-plate heat exchanger, as is known in the art, although various other forms of known plate-type heat exchangers can be used in combination with the valve assembly 14 as would be understood by persons skilled in the particular art.

Figure 2:
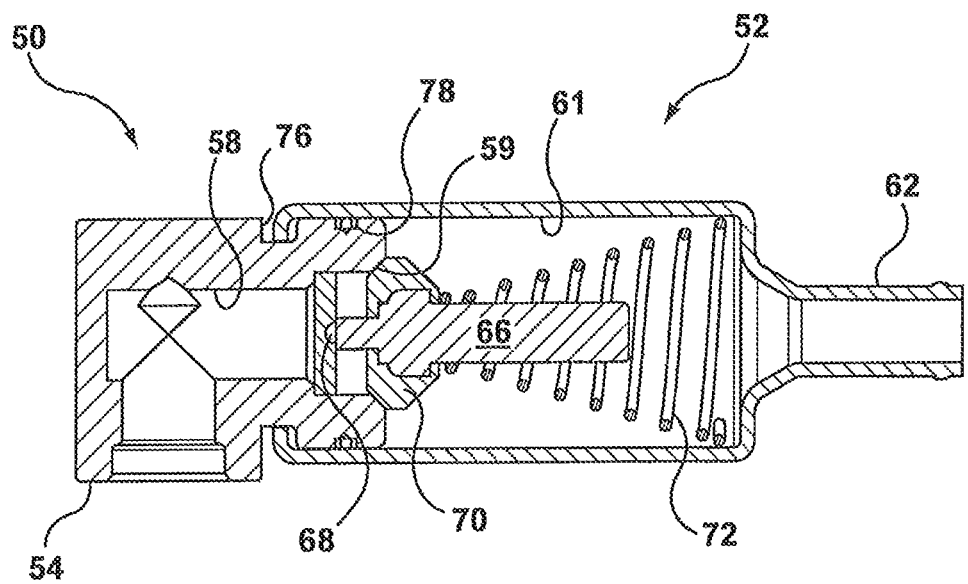
FIG. 2 is a detail, cross-sectional view of the valve structure of FIG. 1.
Figure 3:
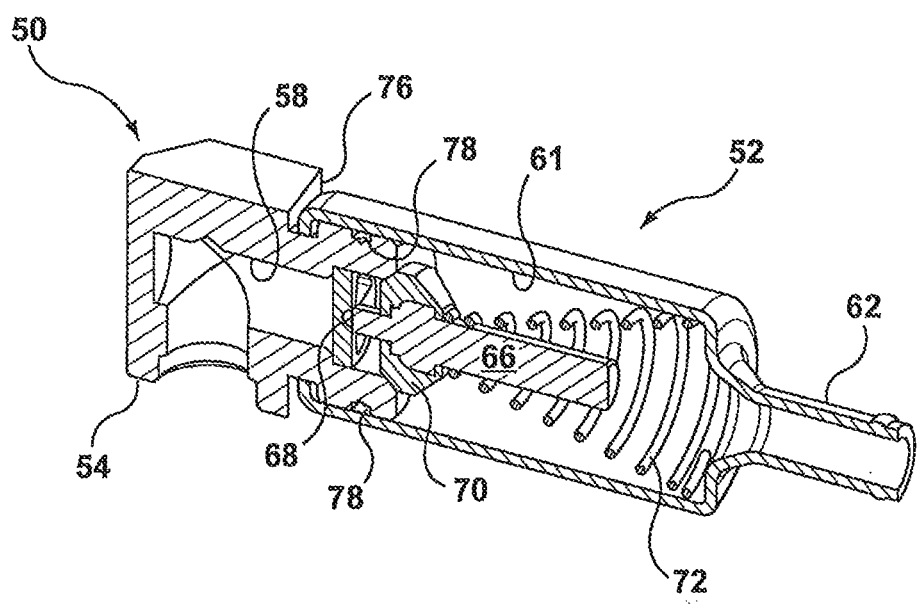
FIG. 3 is a perspective, cross-sectional view of the valve structure as shown in FIG. 2.
Figure 4:
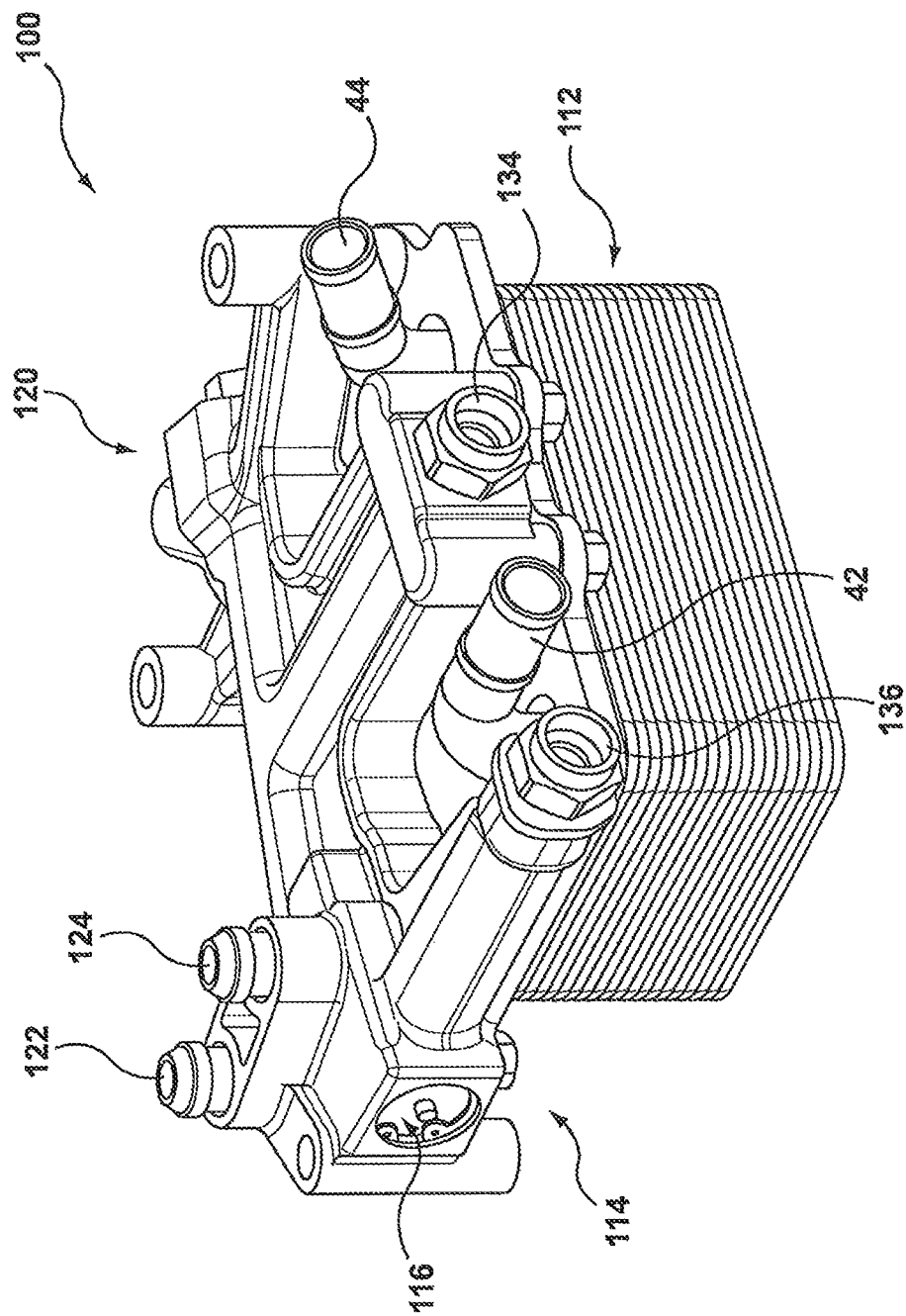
FIG. 4 is a perspective view of a heat exchanger assembly with an integrated valve structure according to another example embodiment of the present disclosure.
Figure 5:
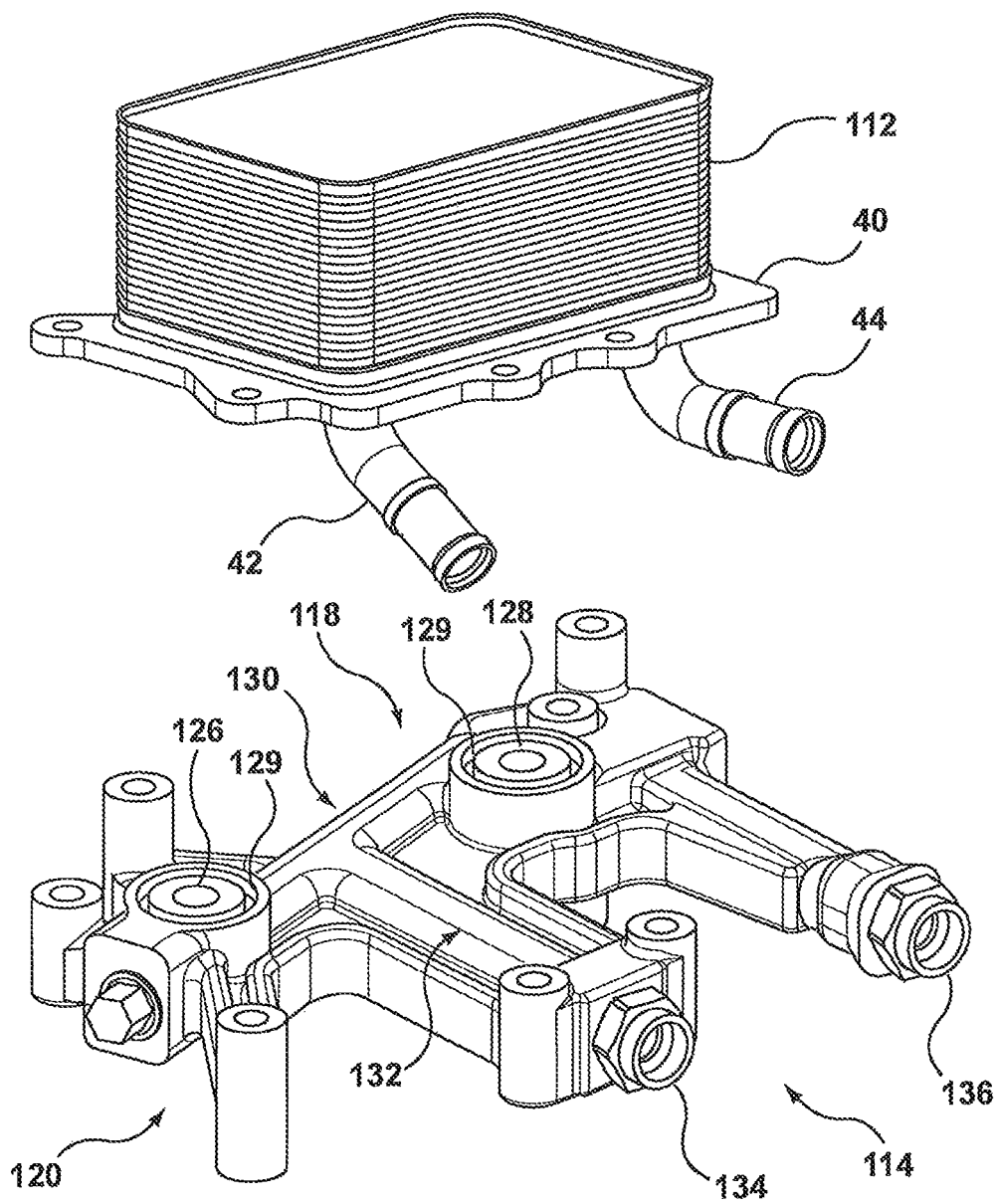
FIG. 5 is an assembly view of the heat exchanger assembly of FIG. 4, with the assembly having been rotated 180 deg.

In the specific embodiment shown in FIGS. 1-3, heat exchanger 12 is comprised of a plurality of stamped heat exchanger plates 16, 18 disposed in alternatingly, stacked, brazed relation to one another forming alternating first and second fluid flow passages therebetween. The heat exchange plates 16, 18 each comprise a generally planar base portion 20 surrounded on all sides by sloping edge walls 22. The heat exchange plates 16, 18 are stacked one on top of another with their edge walls in nested, sealed engagement. Each heat exchange plate 16, 18 is provided with four fluid openings (not shown) near its four corners, each of which serves as an inlet/outlet for a heat exchange fluid to enter/exit one of the first or second fluid flow passages formed between the plates 16, 18. Two of the four fluid openings are raised with respect to the base portion of the plate while the other two fluid openings are formed in and are co-planar with the base portion of the plate 16, 18. The raised openings in one plate 16 align with and seal against the flat or co-planar openings of the adjacent plate 18 thereby spacing apart the adjacent plates 16, 18 and defining the alternating first and second fluid passages therebetween.

The aligned fluid openings in the stacked plates 16, 18 form a pair of first manifolds 26, 28 (i.e. and inlet manifold and an outlet manifold) coupled together by the first fluid flow passages for the flow of a first heat exchange fluid through the heat exchanger 12 and form a pair of second manifolds (i.e. and inlet manifold and an outlet manifold) coupled together by the second fluid flow passages for the flow of a second heat exchange fluid through the heat exchanger 12. For example, depending upon the particular application, one of the first or second heat exchange fluids can be oil (i.e. engine oil or transmission oil) while the other heat exchange fluid can be a standard, known liquid for cooling/heating oil.

End plates 36, 38 enclose the stack of heat exchange plates 16, 18. Depending upon the particular application, the end plates 36, 38 are designed with a particular number of fluid openings, each in fluid communication with either the first manifolds 26, 28 or the second manifolds, for the inlet/outlet of the first and second heat exchange fluids into/out of the heat exchanger 12. In the example shown, the top end plate 36 is provided with four fluid openings while the bottom end plate 38 has no fluid openings. It will be understood, however, that various other configurations (for example, two fluid openings on the top of the heat exchanger and two fluid openings on the bottom, three fluid openings on top bottom and one on the bottom, or vice versa, or all fluid openings provided on the bottom) are also contemplated and included within the scope of the present disclosure.

In the illustrated embodiment, a base plate 40 is provided at the base of the heat exchanger core and is brazed to bottom end plate 38. The base plate is substantially thicker than heat exchanger plates 16, 18 and is provided with various mounting holes 39 to allow for the heat exchanger assembly 10 to be mounted within the heat exchanger system. Depending upon the particular application of the heat exchanger assembly, a base plate 40 may or may not be included and its illustration in FIG. 1 should not be considered to be limiting.

Heat exchangers of the type described above are generally known in the art and, for instance, described in U.S. Pat. No. 7,717,164, the teachings of which are incorporated herein by reference. Furthermore, the above-described heat exchanger 12 has been described for illustrative purposes and it will be understood that any suitable heat exchanger, as known in the art, may be used in the various heat exchanger assemblies described in the present disclosure.

The various fluid connections provided on the top end plate 36 of the heat exchanger 12 will now be described in further detail in reference to the exemplary embodiment shown in FIGS. 1-3.

As shown in FIG. 1, the heat exchanger 12 is provided with four separate fluid connections 42, 44, 46, 48 on its top end plate 36. Each fluid connection is fixedly attached and fluidly coupled to one of the fluid openings provided in end plate 36. Fluid connections 42, 44 each serve as a respective inlet, outlet for one of the first and second heat exchange fluids flowing through the heat exchanger 12. For example, fluid connection 42 may be an inlet for directing a suitable heat exchange fluid for cooling (or warming) into the heat exchanger and fluid connection 44 may be the outlet for directing the suitable heat exchanger fluid (i.e. a coolant) out of the heat exchanger 12 and elsewhere in the heat exchange system. It will be understood however that the specific fluid connections 42, 44 illustrated and described are intended to be exemplary and not limited thereto, as would be understood by persons skilled in the art.

Fluid connections 46, 48 also serve as respective inlet, outlet for the other of the first and second heat exchange fluids flowing through the heat exchanger. In the example described above, if the fluid flowing through connections 42, 44 is a suitable heat exchange fluid for cooling (or warming), then the fluid flowing through connections 46, 48 is a heat exchanger fluid requiring cooling (or warming) such as transmission oil or engine oil. In the subject embodiment, fluid connection 48 is the outlet connection and directs the cooled/heated heat exchange fluid (i.e. transmission oil) from the heat exchanger back into the heat exchange system (i.e. back to the transmission or engine) and is in the form of a known or standard fluid fitting connection.

While the outlet fluid connection 48 is in the form of a known or standard fluid fitting or connection, the inlet fluid connection 46, however, is in the form of an integrated valve structure which either allows the fluid (i.e. the oil) to enter the heat exchanger 12 to be cooled/heated or directs the fluid elsewhere in the heat exchange system so as to "bypass" the heat exchanger 12, as will be discussed in further detail below.

Fluid connection 46 is in the form of a valve assembly 14 fixedly attached to the upper or top end plate 36 of the heat exchanger 12. In some embodiments the valve assembly 14 is brazed directly to the heat exchanger 12 in fluid communication with one of the fluid openings in the top end plate 36. In other embodiments the valve assembly may be bolted to the heat exchanger 12 or secured to the heat exchanger 12 using any suitable means. The valve assembly 14 is comprised of a first part 50 and a second part 52 that are mechanically coupled together. The first part 50 has a first end 54 for brazing (or direct mounting) to the exterior of the heat exchanger 12 and a second end 56 for connecting to second part 52 of the valve assembly 14. A fluid passage 58 interconnects the first end 54 and the second end 56, the fluid passage 58 being aligned with and in fluid communication with the inlet manifold 26 of one of the pairs of manifolds of the heat exchanger 12 (i.e. the first pair of manifolds 26, 28). The second end 56 of the first part 50 is provided with a valve seat 59 for receiving and sealing with a corresponding valve element 60.

The second part 52 of the valve assembly 14 comprises a valve chamber 61 and has a first end 62 for coupling to a fluid line or external fluid conduit provided within the overall heat exchange system, and a second end 64 for receiving and sealingly connecting with the corresponding second end 56 of the first part 50 of the housing. In the specific embodiment illustrated, the first part 50 and second part 52 of the housing are joined together by a mechanical crimping process after the first part 50 is brazed or otherwise fixedly attached to the heat exchanger 12, although other means for mechanically joining the two parts 50, 52 of the valve assembly 14 are also contemplated herein. For instance, the first and second parts 50, 52 can be formed with corresponding threaded second ends 56, 64. Alternatively, they could be secured together with clips or may be formed as corresponding ends of a twist-lock, for example.

The valve chamber 61 is appropriately sized to receive a valve mechanism which includes a thermal actuator or temperature responsive actuator (i.e. a wax motor or electronic, solenoid valve) 66, as is known in the art. In the illustrated embodiment, the thermal actuator 66 includes an actuator piston 68 moveable from a first position to a second position by means of expansion/contraction of the wax (or other suitable material) contained in the thermal actuator 66 which expands/contracts in response to the temperature of the fluid entering the valve chamber 61, although it will be understood that the actuator piston may also be controlled by a solenoid coil, for example, or any other suitable means. A valve disk or sealing disk 70 is operably coupled to the thermal actuator 66 (i.e. coupled to one end of the actuator piston 68). The valve disk 70 sits within or seals against the corresponding valve seat 59 provided in the second end 56 of the first part 50 of the valve assembly 14 when the thermal actuator 66 is in its first or closed position (i.e. cold condition), with the valve disk 70 being moved away from the valve seat 59 through expansion of the wax material thereby opening fluid communication between the valve chamber 61 in the second part 52 of the valve housing and the fluid passage within the first part 50 of the valve housing.

When the valve mechanism is in the "closed" position with the valve disk 70 sealed against valve seat 59, while some fluid entering the valve assembly 14 may still seep past valve disk 70 and enter the heat exchanger 12, the majority of the fluid (i.e. the transmission oil) bypasses the heat exchanger through an outlet port provided upstream of first end 62 of the second part 52 (such as a T-type junction or fitting) or by means of an outlet port (not shown) provided in second part 52 in communication with valve chamber 61 for allowing fluid to bypass the heat exchanger 12.

In certain embodiments, the valve chamber 61 in the second part 52 of the valve housing contains a biasing means 72 that biases the valve disk 70 in its first or closed position against the valve seat. In the illustrated embodiment, the baking means 72 is in the form of a spring, although the biasing means is not intended to be limited to a spring and any suitable means for biasing the valve disk 70 may be used.

The first part 50 of the valve housing is typically made of aluminium (i.e. 6061aluminum alloy) or any other suitable material so that the first part 50 can be positioned on the heat exchanger 12 and the entire heat exchanger assembly can be brazed together in a brazing furnace. Since the first part 50 of the valve housing does not contain any of the valve or thermal actuator components), this component of the valve assembly 14 can be brazed directly to the heat exchanger 12. Once the assembly has cooled, the second part 52 of the valve housing, which houses the thermal valve components/mechanism, is mechanically fixed to the first part 50. Since only the first part 50 of the valve assembly is adapted to be brazed directly to the heat exchanger, the second part 52 of the valve assembly can be made of any suitable metallic or non-metallic material (such as aluminum, plastic or other non-metallic material) and can, therefore, be rather lightweight.

As mentioned above, in a preferred embodiment, the second part 52 of the housing is crimped over the second end 56 of the first part 52 of the housing. To facilitate this connection, the second end 56 of the first part 52 is provided with a circumferentially extending groove or notch 76 for receiving the crimped, open end of the second part 52 of the valve assembly 14. To further enhance the seal between the first and second parts 50, 52 of the valve assembly 14, the second end 56 can also be provided with a circumferentially-extending sealing groove 78 in the outer surface thereof for receiving a seal means, such as an O-ring, for providing an additional seal between the outer surface of the second end 56 of the first part 50 and the inner surface of the valve chamber 61 of the second part 52.

In operation, the valve assembly 14 remains in its "closed" position with the sealing disk 70 seated within or sealed against valve seat 59 until the temperature of the fluid (i.e. transmission oil) being sensed in valve chamber 61 reaches a predetermined temperature. As a result of the increase in temperature, the thermal actuator 66 is activated by means of expansion of the thermal material (or activation of a solenoid, for example) which causes the valve disk 70 to move away from valve seat 59 thereby creating a fluid connection between valve chamber 61 and fluid channel 58. The fluid entering valve assembly 58 is then directed through heat exchanger 12 for cooling before being directed out of the heat exchanger 12 through outlet 48 and back to into the overall heat exchange circuit, for example back to the transmission. By having a portion (i.e. first part 50) of the valve assembly 14 brazed or mounted directly to the heat exchanger core which functions as the fluid inlet (or outlet) fitting to the heat exchanger, at least one set of fluid connections is eliminated thereby reducing the total potential points of leakage in the overall heat exchanger system.

While the above-described example embodiment has been described with reference to a thermal actuator 66 in the form of a "wax motor", it will be understood that the subject embodiment is not limited thereto and that any suitable thermal actuator for actuating a valve mechanism may be used. For instance, an electronic valve mechanism can also be used wherein the thermal actuator 66 is in the form of a temperature responsive actuator including a solenoid having a solenoid coil and central actuator shaft coupled to the valve disk 70. Therefore, it will be understood that wax motors, electronic valve mechanisms or any suitable valve mechanism known in the art may be used in conjunction with the described heat exchanger assembly based on the particular application of the heat exchanger assembly 10 and the desired function of the valve.

As well, while the above-described example embodiment has been described with reference to the valve assembly 14 being fixedly attached or mounted directly to the top end plate 36 of the heat exchanger 12, it will be understood that the valve assembly 14 could be attached or mounted to the bottom end of the heat exchanger 12 through corresponding openings provided in the base plate 40 and bottom end plate 38 of the heat exchanger 12, depending upon the particular application and desired location of the fluid connections.

Another example embodiment of a heat exchanger assembly with an integrated valve structure or valve integration unit according to the present disclosure will now be described with specific reference being made to FIGS. 4-7.

In the subject embodiment, the heat exchanger assembly 100 is comprised of a heat exchanger 112 and a valve integration unit in the form of a manifold structure 114 with integrated valve assembly 116. The heat exchanger 112 is generally in the same form as the heat exchanger 12 described above (and therefore will not be described in further detail with regard to this example embodiment) with the obvious difference that, in the specific example embodiment shown, all of the fluid connections for directing the first and second heat exchanger fluids into and out of the heat exchanger 112 are provided at the bottom end of the heat exchanger 112 rather than the top end of the heat exchanger 112. However, it will be understood, that the heat exchanger assembly 100 is not necessarily limited to this particular heat exchanger 112 arrangement. For instance, fluid connections 42, 44 could be provided at the top of the heat exchanger 112 with the manifold structure 114 being positioned at the bottom end of the heat exchanger 112, or vice versa.

The manifold structure 114 is an extruded or cast structure that is formed with an internal valve cavity 117 (shown schematically in FIGS. 6A and 6B) adapted to receive valve assembly 116, such as a control valve or thermal valve, for directing a first fluid (i.e. transmission oil) either through heat exchanger 112 to be warmed and returned back to the transmission 111, or away from heat exchanger 112 to another heat exchange component (such as a cooler) 113 elsewhere in the overall heat exchange system and then returned back to the transmission 111 through the manifold structure 114. Accordingly, the manifold structure 114 is also formed with various internal fluid passages and corresponding fluid inlet/outlet ports for circuiting the heat exchange fluid or first fluid through the heat exchanger assembly as will be described in further detail below.

For the purpose of illustration, the operation of the heat exchanger assembly 100 will be described in the context of a thermal management unit which, depending upon the temperature of the oil entering the transmission 111, will either direct the transmission oil to a warmer, i.e. heat exchanger 112 to be heated or to a cooler, i.e. heat exchanger 113, to be cooled to ensure that the temperature of the transmission oil is within a desired range. Therefore, for the purpose of illustration, the first heat exchange fluid entering the manifold structure 114 and being directed to either heat exchanger 112 or elsewhere (i.e. heat exchanger 113, for example) in the heat exchange system is oil, while the heat exchanger 112 is also adapted to receive a second fluid (i.e. through fluid connections 42, 44) which may be any known heat exchange fluid suitable for warming the oil. It will be understood, however, that the heat exchanger 112 is not limited to a warmer for transmission oil and that various other heat exchangers may be used depending on the particular application and desired function of the heat exchanger assembly.

The manifold structure 114 has a first side 118 that is adapted to be in face-to-face contact and mounted to the base plate 40 of the heat exchanger 112, and a second side 120 opposite to the first side 118 that faces away from heat exchanger 112. The second side 120 of the manifold structure 114 (see FIG. 4) is provided with two fluid ports 122, 124. Fluid port 122 serves as an inlet port for receiving oil from the transmission 111 while fluid port 124 serves as an oil outlet from the manifold structure 114 for returning the oil to the transmission 111. The first side 118 of the manifold structure 214 is also provided with a pair of fluid ports 126, 128 (see FIG. 5). When the manifold structure 114 is mounted to heat exchanger 112, fluid port 126 is aligned with and in fluid communication with the first fluid inlet manifold of heat exchanger 112 while fluid port 128 is aligned with and in fluid communication with the first fluid outlet manifold. Fluid ports 126, 128 are both structured with sealing grooves 129 formed around the port openings for receiving an appropriate sealing means as is known in the art, for example an O-ring. The manifold structure 114 is further provided with a pair of fluid ports 134, 136. Fluid port 134 serves as an outlet port for the manifold structure 114 for directing the oil (or first heat exchanger fluid) out of the manifold structure 114 to another heat exchanger component elsewhere in the overall heat exchanger system. Fluid port 136 serves as an inlet port to the manifold structure 114 for receiving the oil (or first heat exchange fluid) from the other heat exchanger component and returning it to the transmission 111 through the manifold structure 114.

A first internal fluid channel 130 is formed within manifold structure 114 and is in fluid communication with the fluid inlet port 122 for receiving the first fluid or transmission oil from the transmission 111. Internal fluid channel 130 is also in fluid communication with fluid port 126 which directs the oil (or first heat exchange fluid) entering the manifold structure 114 to heat exchanger 112 thereby bringing the first fluid into heat exchange relationship with the second fluid flowing through heat exchanger 112. The first heat exchange fluid flows through the heat exchanger 112 and is returned to the manifold structure 112 through fluid port 128 to the internal valve cavity 117.

A second internal fluid channel 132 branches away from the first internal fluid channel 130 and directs the oil (or first heat exchange fluid) from inlet port 122 through the manifold structure 114 and out of the manifold structure 114 through outlet port 134 to another heat exchange component elsewhere in the overall heat exchange system. Fluid flowing through the second internal fluid channel 132 does not enter heat exchanger 112 and is, instead, directed to another heat exchanger or heat exchange component located elsewhere in the overall heat exchanger system. The first heat exchange fluid is then returned to the manifold structure through inlet port 136. A third internal fluid channel 135 is formed within the manifold structure 114 which interconnects inlet port 136 and internal valve cavity 117.

The valve assembly 116 will now be described in further detail in reference to FIGS. 6A and 6B. As mentioned above, valve assembly 116 is housed within internal valve cavity 117, the internal cavity 117 and valve assembly 116 being sealed by means of a valve cap 140. The internal valve cavity 117 serves as a valve chamber for receiving the components of the valve mechanism which includes a thermal or temperature responsive actuator (i.e. a wax motor or an electronic solenoid valve) 66, as is known in the art. The thermal actuator 66 includes an actuator piston moveable from a first position to a second position by means of expansion/contraction of the wax (or other suitable material) contained in the thermal actuator 66 which expands/contracts in response to the temperature of the fluid entering the internal valve cavity 117 (i.e. the temperature of the oil being returned to the transmission 111). The actuator piston 68 may also be controlled by activation of a solenoid coil when an electronic valve mechanism or solenoid valve is used. A valve disk or sealing disk 70 is operably coupled to the thermal actuator 66 (i.e. coupled to one end of the actuator piston 68) and sits within or seals against a corresponding valve seat 119 formed in the valve cavity 117 when the valve mechanism is in its "closed" position (or second valve position) illustrated schematically in FIG. 6B by the directional flow arrows, the valve disk 70 being moved away from the valve seat 119 when the valve mechanism is in the "open" position (or first valve position) illustrated schematically in FIG. 6A by the directional flow arrows. The thermal actuator 66 may also be provided with one or more biasing means (i.e. a spring) to ensure the valve disk 70 returns to its "normal" open position (shown in FIG. 6A).

The internal valve cavity 117 has a first inlet port 144 for receiving the first fluid exiting heat exchanger 112 through port 128 and a second inlet port 146 for receiving the first heat exchange fluid that has been returned to the manifold structure 114 after bypassing heat exchanger 112. The internal valve cavity 117 is also provided with an outlet port 145 in fluid communication with the manifold structure 114 outlet port 124 for returning the first heat exchange fluid, i.e. the oil to the transmission 111.

Figure 6B:
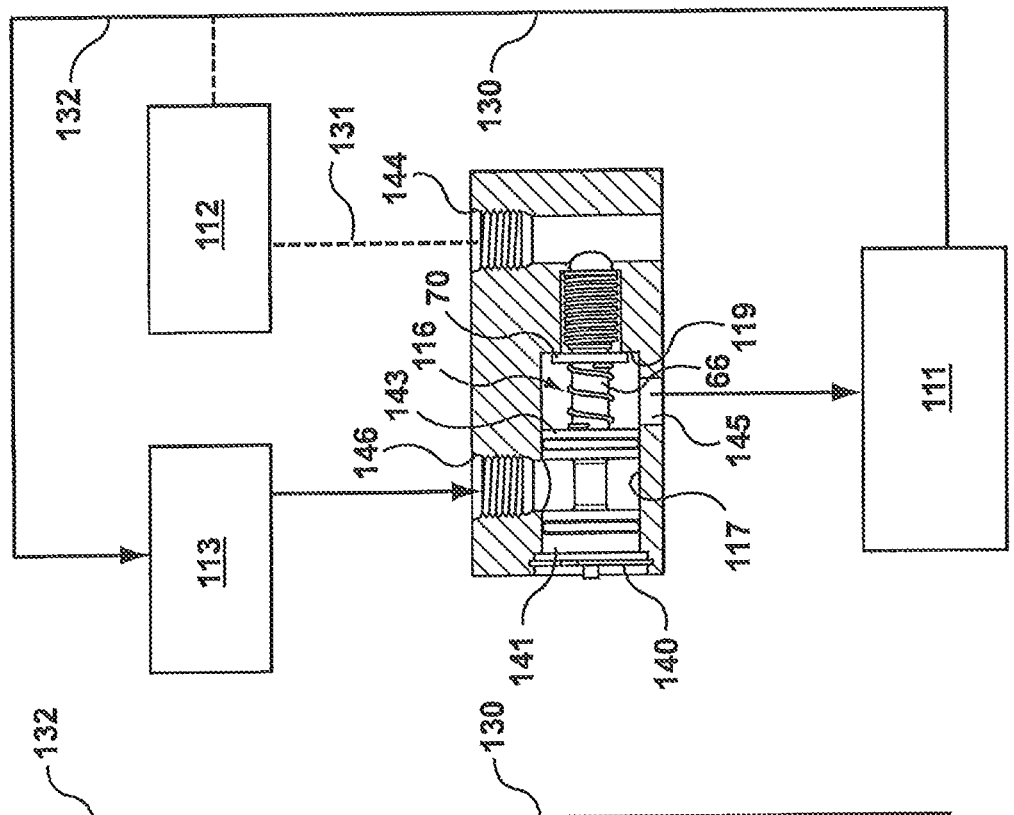
FIG. 6B is a schematic view of the heat exchanger assembly of FIG. 4 illustrating the hot flow condition of the integrated valve structure.
Figure 6A:
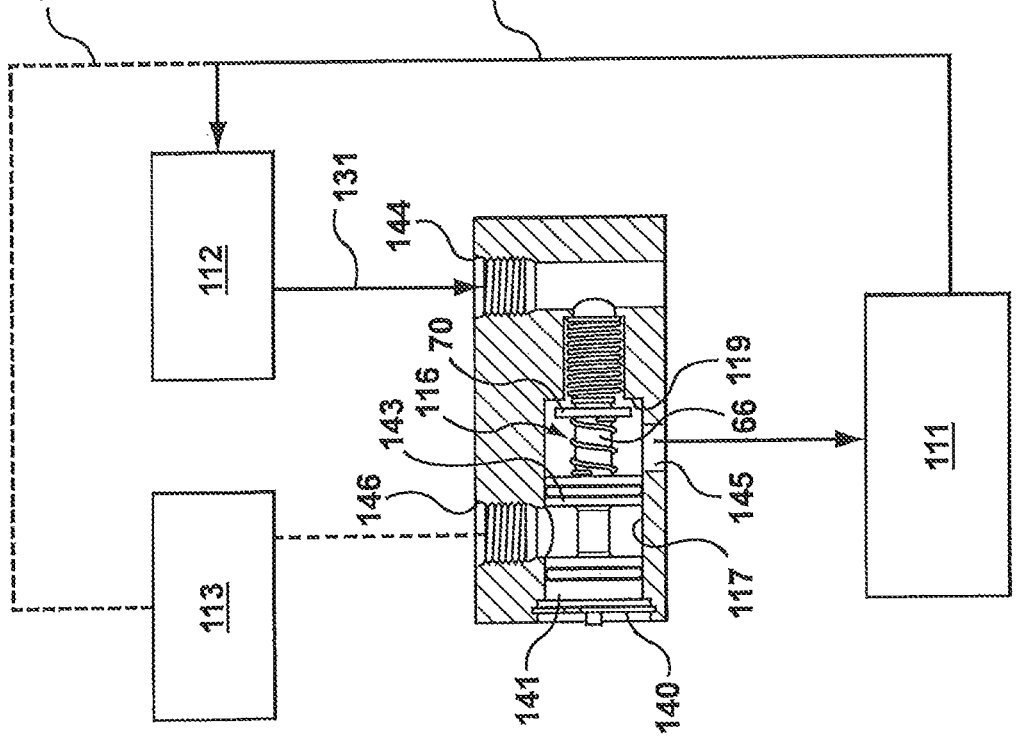
FIG. 6A is a schematic view of the heat exchanger assembly of FIG. 4 illustrating the cold flow condition of the integrated valve structure.
Figure 7A:
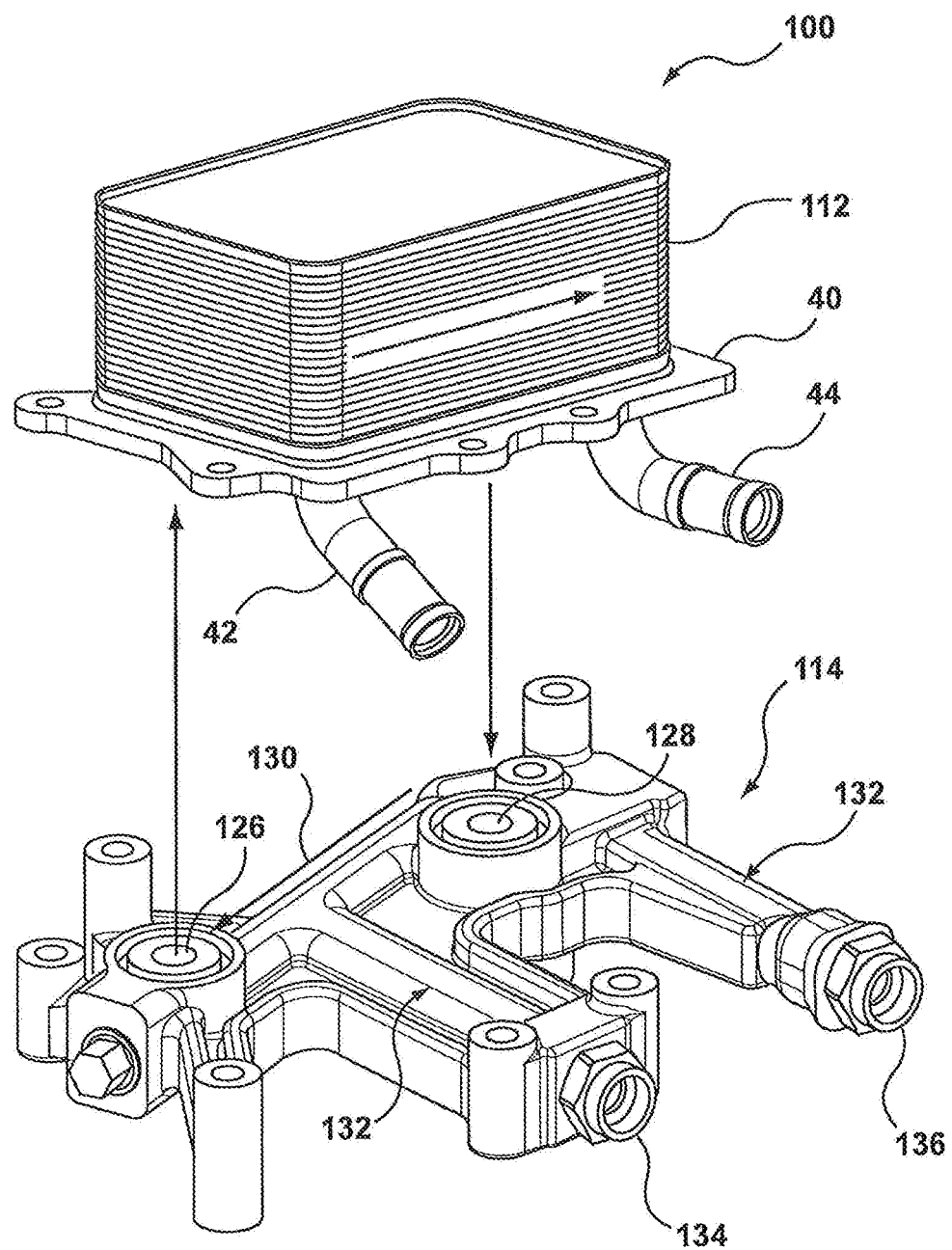
FIG. 7A is an assembly view as shown in FIG. 5 illustrating the "cold" condition flow path through the heat exchanger assembly.
Figure 7B:
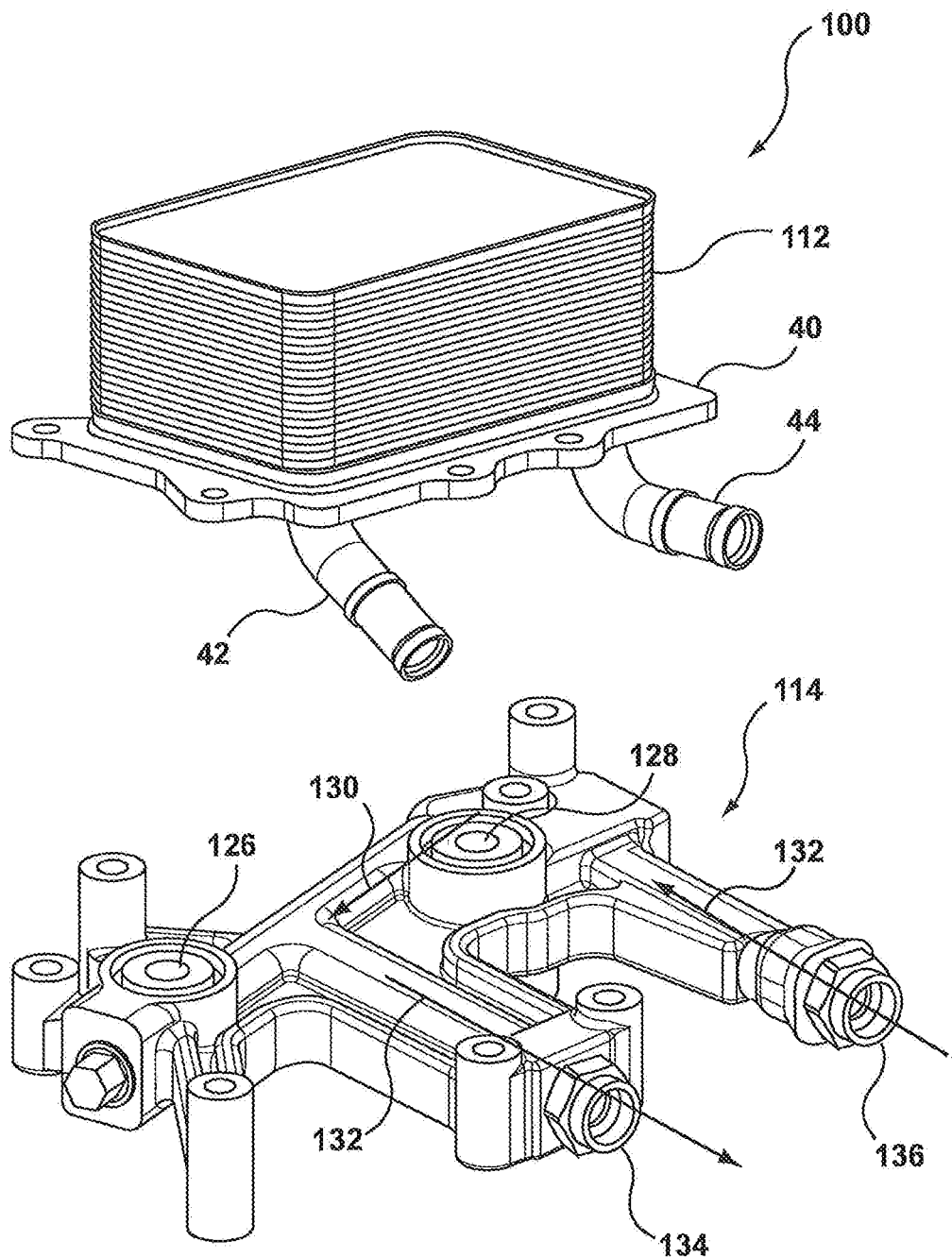
FIG. 7B is an assembly view as shown in FIG. 5 illustrating the "hot" condition flow path through the heat exchanger assembly.
Figure 8:
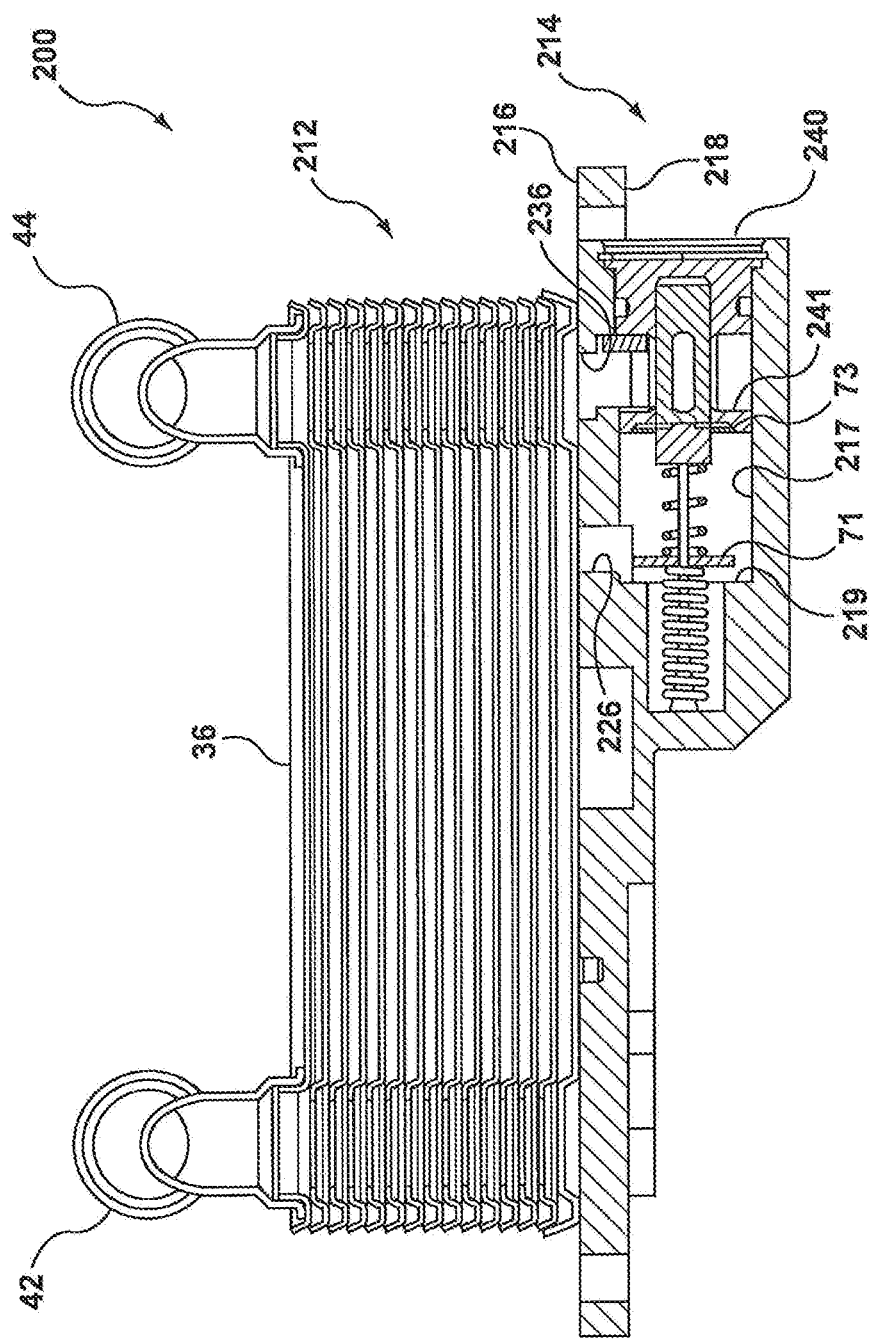
FIG. 8 is a sectional view of a heat exchanger assembly with an integrated valve structure according to another example embodiment of the present disclosure.
Figure 9:
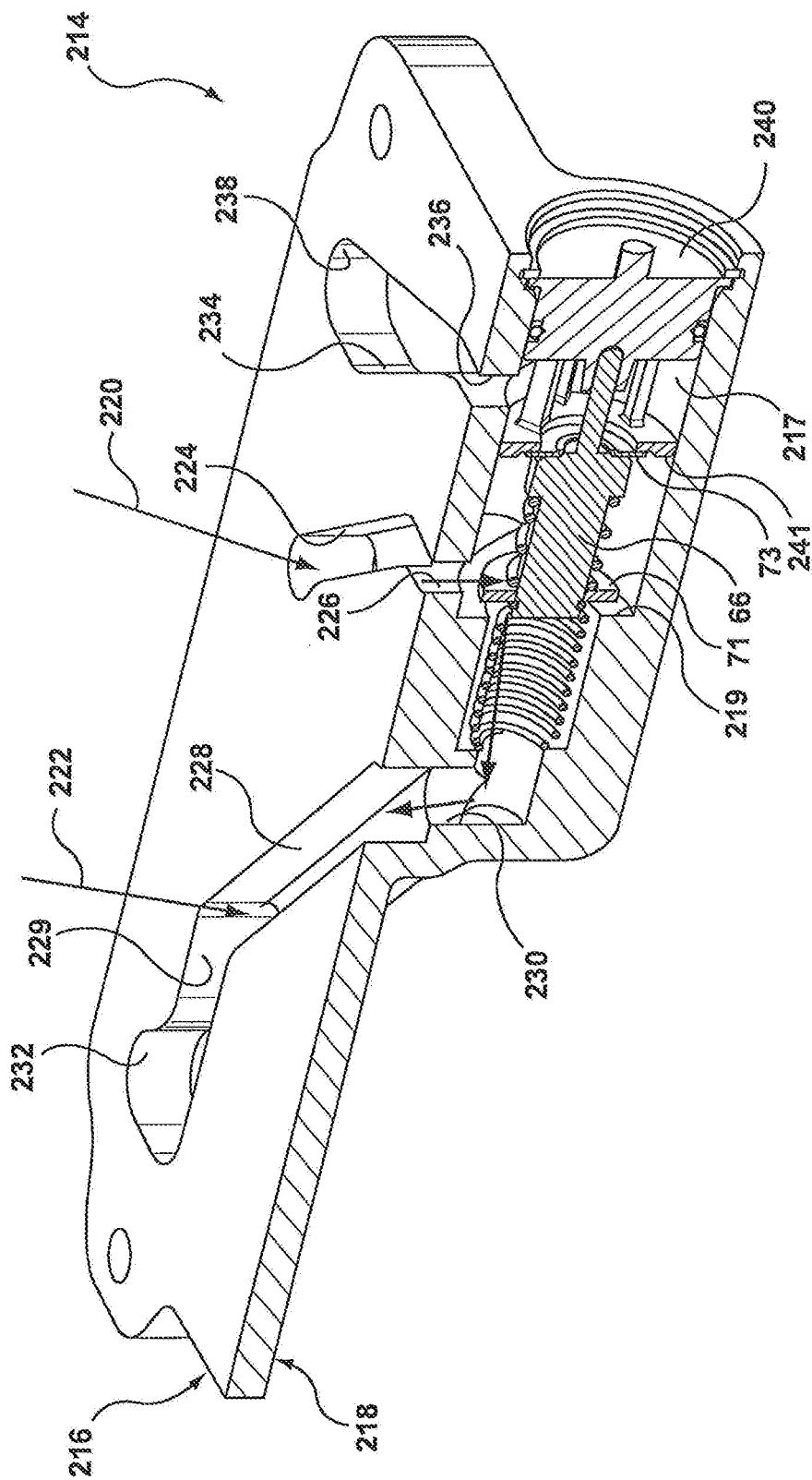
FIG. 9 is a perspective, cross-sectional view of a base plate for the heat exchanger assembly of FIG. 8 illustrating a first operational position of the integrated valve structure.
Figure 10:
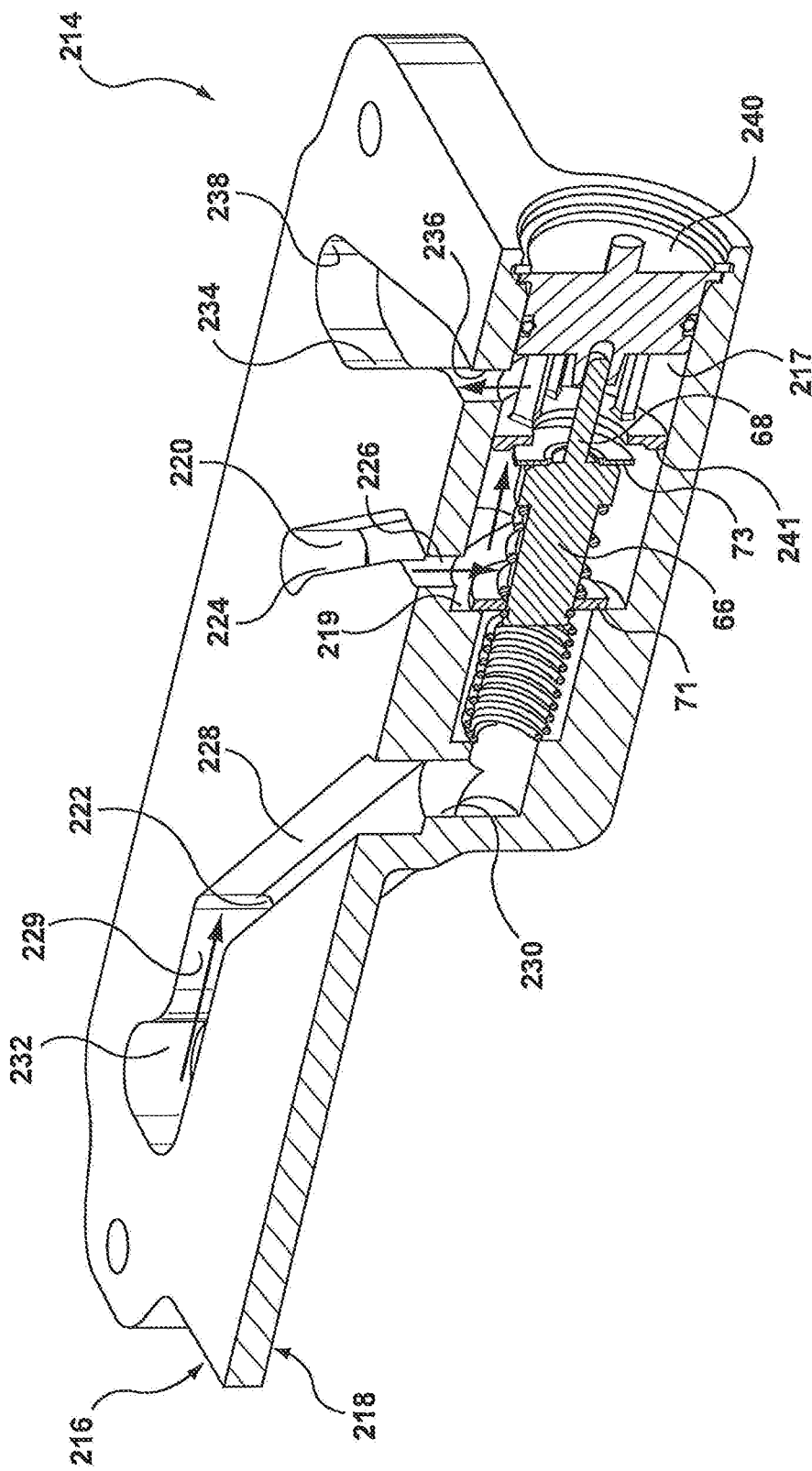
FIG. 10 is a perspective, cross-sectional view of the base plate assembly of FIG. 8 illustrating a second operational position of the integrated valve structure.
Figure 11:
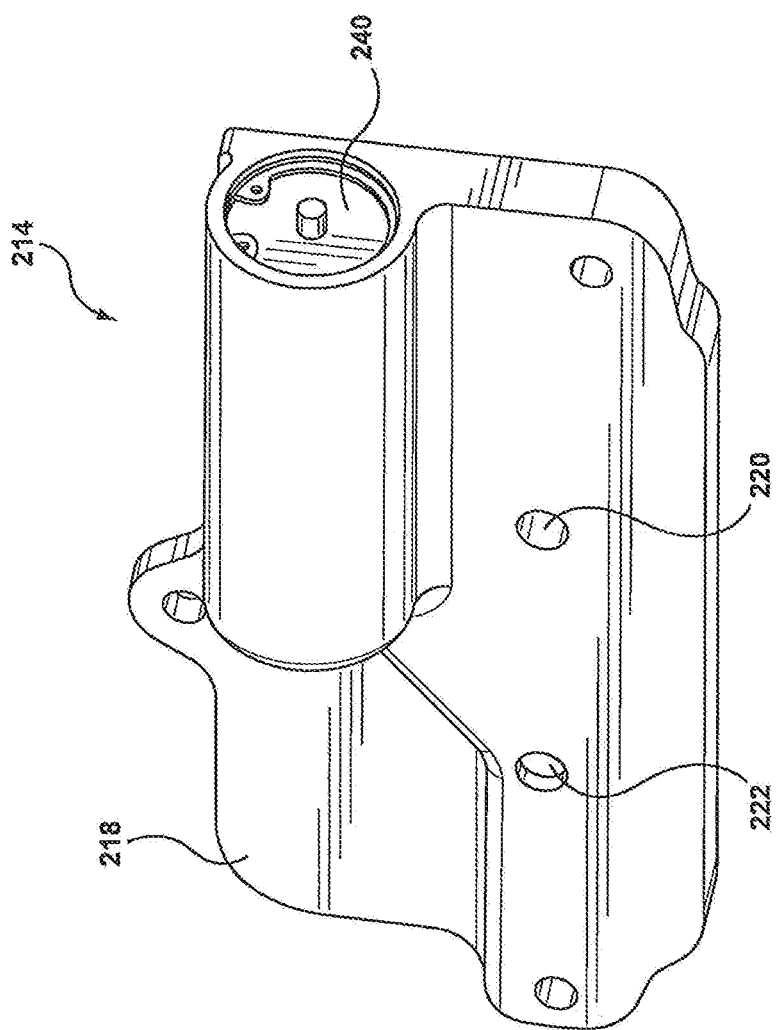
FIG. 11 is perspective, bottom view of the base plate of FIGS. 9 and 10.
Figure 12:
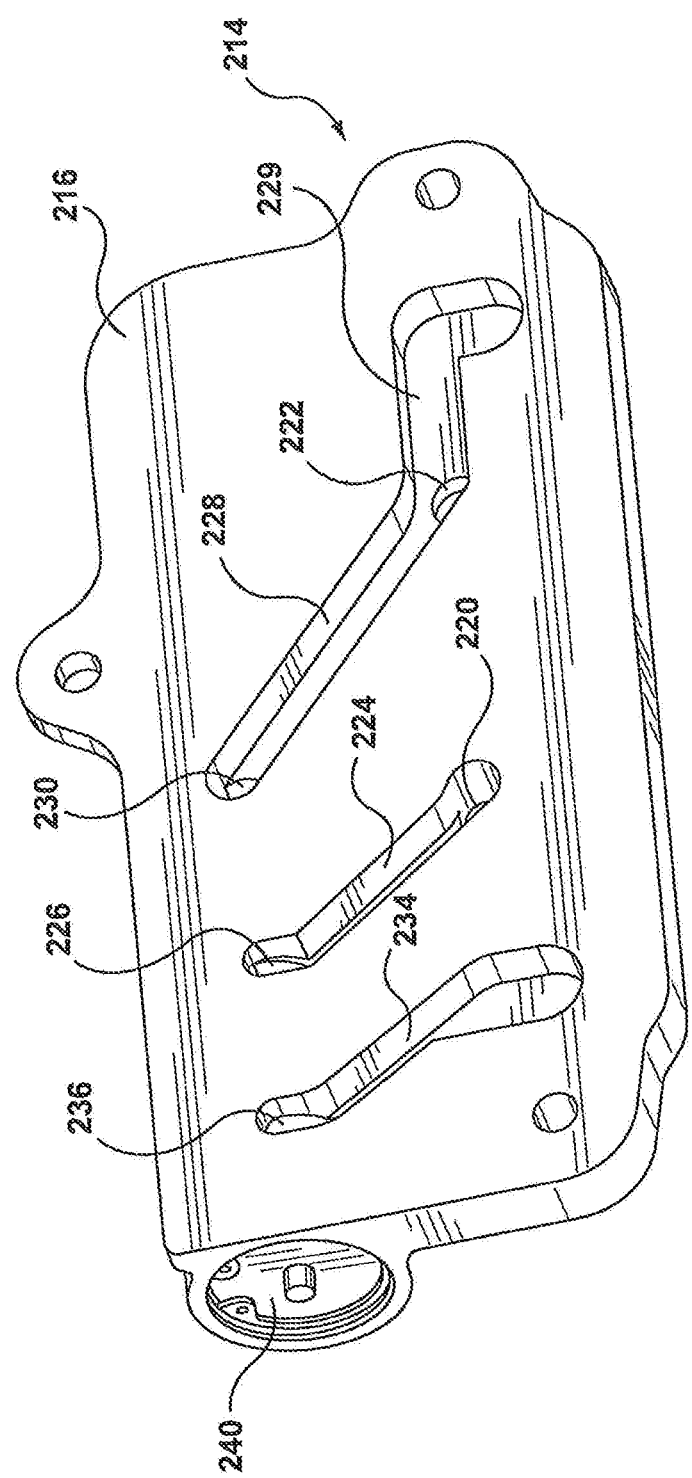
FIG. 12 is a perspective top view of the base plate of FIGS. 8 and 9.

The valve cap 140, as shown in FIGS. 6A-6B, has a first enlarged end 141 which is solid and seals the valve cavity 117 and a second enlarged end 143 which seats one end of the thermal actuator 66. The second enlarged end 143 is provided with openings therethrough to allow fluid entering the valve cavity 117 through inlet port 146 to pass through the valve cap second end 143 to outlet port 145. In some embodiments a second valve disk (not shown) is also coupled to the thermal actuator 66 opposite to valve disk 70 for sealing against the second end 143 of the valve cap 140 when the valve is in the "open" or first valve position. The valve cap may be provided with seal members (i.e. O-rings) to enhance the seal between the valve cap 140 and the internal valve cavity 117. While a particular valve cap and valve mechanism have been described, it will be understood that any suitable valve mechanism and valve cap can be used as is known and understood in the art.

In operation, the first heat exchange fluid or oil leaves the transmission 111 and enters manifold structure 114 through inlet port 122. Initially, for instance during automobile start-up conditions, the fluid is directed to inlet port 122 through the first and second internal fluid channels 130, 132. Accordingly, a portion of the first heat exchange fluid (or transmission oil) initially entering the manifold structure 114 is directed to heat exchanger 112 while a portion is directed through the manifold structure 114 to another heat exchanger 113, for instance an oil-to-air (OTA) cooler downstream from manifold structure 114 outlet port 134. The first heat exchange fluid (or transmission oil) returned to the manifold structure 114 from either heat exchanger 112 or the other heat exchanger 113 external to heat exchanger assembly 100 enters the internal valve cavity 117 where the temperature of the fluid is "sensed" by the thermal actuator 66 that forms part of the valve assembly 116 before being returned to the transmission 111 via outlet port 124.

If the fluid being returned to the manifold structure 114 and entering the internal valve cavity 117 is "cold" (or within a certain temperature range), the valve assembly 116 will remain in its "normal", open position thereby directing the fluid entering the manifold structure 114 to heat exchanger 112 (for instance and oil-to-water (OTW) heat exchanger) for warming. As the temperature of the fluid entering the internal valve cavity 117 increases, in the illustrated embodiment the thermal actuator 66 is activated by means of expansion of the wax or other expandable material contained therein (or any other suitable activation means) thereby causing the valve disk 70 to move towards valve seat 119 until the valve mechanism reaches its "closed" position wherein the valve disk 70 seals against valve seat 119. With the valve mechanism in its "closed" position, fluid entering the manifold structure 114 through inlet port 122 will be directed through the second internal channel 132 towards outlet port 134 where it will be directed elsewhere in the overall heat exchanger system (i.e. to the OTA or other heat exchanger 113) for cooling. Due to the increased flow resistance through heat exchanger 112 resulting from the valve mechanism being in the "closed" position most, if not all, of the fluid entering the manifold structure 112 will be directed out of the manifold structure 114 to be cooled. Once the temperature of the fluid entering the internal valve cavity 117 through the manifold structure 114 inlet port 136 has been sufficiently cooled and reaches a predetermined temperature range, the thermal actuator 66 will once again be activated (through contraction of the thermal material) causing the valve mechanism to return to its "open" position once again directing fluid to heat exchanger 112 to be warmed. Accordingly, in the illustrated embodiment, the manifold structure 114 and internal valve assembly 116 are used to sense the temperature of the fluid returning to the transmission 111 so as to direct the fluid exiting the transmission 111 to the appropriate heat exchange component (i.e. to heat exchanger 112 for warming, or to a cooler 113 located elsewhere in the heat exchanger system).

While a particular fluid circuit has been described in connection with the above-described example embodiment, it will be understood that the heat exchanger assembly 100 can be modified or adapted to suit alternate fluid circuits depending upon the particular application. For instance, the manifold structure 114 can be modified to have additional (or fewer) internal fluid channels to allow fluid to be circuited through the manifold structure 114 in a desired pattern or fluid circuit. As well, while a particular valve assembly 116 has generally been described as having a thermal actuator in the form of a "wax motor", it will be understood that the subject embodiment is not limited to a "wax motor" and that any suitable thermal actuator for actuating a valve mechanism may be used. For instance, an electronic valve mechanism can also be used wherein the thermal or temperature responsive actuator is operated by means of a solenoid having a solenoid coil and central actuator shaft coupled to the valve disk. Therefore, it will be understood that wax motors, electronic valve mechanisms or any other suitable, temperature responsive valve mechanism known in the art may be used in conjunction with the described heat exchanger assembly 100 depending upon the particular application and the desired function of the valve and heat exchanger assembly 100.

Additionally, while the manifold structure 114 has been described as having an internal valve cavity 117 adapted to receive the components of a valve mechanism, the internal valve cavity being sealed to the outside by valve cap 140, it will be understood that the manifold structure 114 is not limited to this particular structure and that the manifold structure 114 can be adapted to receive an external valve assembly that is mechanically joined to the manifold structure 114, similar to the embodiment described in connection with FIGS. 1-3 for instance, to form the valve cavity 117 and valve assembly 116.

Another example embodiment of a heat exchanger assembly with integrated valve structure or valve integration unit according to the present disclosure will now be described with specific reference being made to FIGS. 8-12.

In the subject embodiment, the heat exchanger assembly 200 is comprised of a heat exchanger 212 with a valve integration unit in the form of a base plate 214 with integrated valve assembly 216. The heat exchanger 212 is generally in the same form as the heat exchanger 12 described above and, therefore, will not be described in further detail with regard to this example embodiment although reference will be made to the description provided above. However, it will be understood that, the heat exchanger assembly 200 is not necessarily limited to the particular heat exchanger arrangement described above and that any suitable heat exchanger, as known in the art, could be used depending upon the particular use/application of the heat exchanger assembly 212.

By way of non-limiting example, in the subject embodiment the heat exchanger assembly 200 is being used as a transmission oil cooler. The heat exchanger 212 is provided with two fluid connections on its top end plate 36 for the flow of a heat exchange fluid through the heat exchanger 212 (i.e. a suitable heat exchange fluid for cooling/warming) and two fluid connections are provided through the base plate 214 for directing the flow of the other heat exchange fluid (i.e. transmission oil) through the heat exchanger 212. Therefore, in the subject embodiment, the first heat exchange fluid entering the heat exchanger 212 through base plate 214 is oil, while the second heat exchanger fluid flowing through heat exchanger 212 via fluid connections 42, 44 is a suitable fluid for cooling/warming oil.

Base plate 214 is generally an extruded, forged or machined plate that has first surface 216 that is adapted to be brazed directly to the bottom end plate 38 of the heat exchanger 212 and an opposed second surface 218. An internal valve cavity 217 is formed within the body of the base plate 214 and protrudes outwardly from the second surface 218 of the base plate 214. The internal valve cavity 217 serves as a valve chamber and is adapted to receive the components of a valve mechanism 221 which includes a thermal or temperature responsive actuator 66 (i.e. a wax motor or an electronic valve mechanism such as a solenoid valve or any other suitable valve mechanism), as described above in connection with the other example embodiments. A valve cap 240 seals the valve mechanism and closes the internal valve cavity 217. In the illustrated embodiment, the thermal actuator 66 includes an actuator piston 68 moveable between a first position and a second position by means of expansion/contraction of the wax (or other suitable material) contained in the thermal actuator 66 which expands/contracts in response to the temperature of the fluid entering the internal valve cavity 217. The actuator piston 68 may also be controlled by activation of a solenoid coil or any other suitable valve activation means. A spool-type valve member is operably coupled to the thermal actuator 66, the valve member having spaced apart first and second valve disks 71, 73. The first valve disk 71 is adapted to seal against a corresponding valve seat 219 formed in the valve cavity 217 when the valve mechanism 221 is position to allow fluid to be directed from the transmission to heat exchanger 212 for cooling/warming. The second valve disk 73 is adapted to seal against a valve seat 241 provided by and end of the valve cap 240 that extends into the internal valve chamber 217 when the valve mechanism 221 is positioned to direct fluid away from or allow the fluid to bypass heat exchanger 212 and be returned to the transmission, as will be described in further detail below.

While valve mechanism 221 has generally been described as having a thermal actuator 66 in the form of a "wax motor", as with the above-described embodiments, it will be understood that the subject embodiment is not limited to a "wax motor" and that any suitable thermal or temperature responsive actuator for actuating a valve mechanism may be used. For instance, an electronic valve mechanism can also be used wherein the thermal or temperature responsive actuator is operated by means of a solenoid having a solenoid coil and central actuator shaft coupled to the valve disk or spool-type valve member. Therefore, it will be understood that wax motors, electronic valve mechanisms or any other suitable, temperature responsive valve mechanism known in the art may be used in conjunction with the described heat exchanger assembly 200 depending upon the particular application and the desired function of the valve and heat exchanger assembly 200.

Base plate 214 is provided with fluid ports 220, 222 on the second surface thereof to allow the first heat exchanger fluid, i.e. the transmission oil, to enter and exit the heat exchanger assembly 200. In the illustrated embodiment, fluid port 220 serves as an inlet port and is adapted to receive the first heat exchange fluid, i.e. oil from an automobile transmission, while fluid port 222 serves as an outlet port for directing the first heat exchange fluid out of the heat exchanger assembly 200 and returning the fluid to the transmission. A first fluid channel 224 is formed within the first surface of the base plate 214 which interconnects fluid port 220 and internal valve cavity 217 by means of a valve inlet port 226. A second fluid channel 228 formed in the first surface of the base plate 214 interconnects the internal valve cavity 217 and fluid outlet port 222 by means of a valve outlet port 230. The second fluid channel 228 has a branch 229 that extends beyond fluid port 222, branch 229 having an end 232 that is adapted to align with and seal against the first fluid outlet manifold (i.e. the oil outlet manifold) of heat exchanger 214. Therefore, second fluid channel 228 is adapted to either direct fluid exiting the internal valve cavity 117 out of the heat exchanger assembly 200 and back to the automobile transmission through outlet port 222 or to direct fluid exiting the heat exchanger 212 (through branch 229) out of the heat exchanger assembly 200 and back to the automobile transmission, depending upon the particular position of the valve mechanism or thermal actuator 66. The base plate 214 further includes a third fluid channel 234 which is in fluid communication with internal valve cavity 217 by means of a second valve outlet port 236, the third fluid channel 234 having an end 238 that is adapted to align with and seal against the first fluid inlet manifold of heat exchanger 212.

The fluid circuiting through heat exchanger assembly 200 will now be described in further detail. In the example embodiment of the heat exchanger assembly 200 being used as a transmission oil cooler, the oil (or first heat exchange fluid) exits the automobile transmission and enters heat exchanger assembly 200 through fluid port 220. The fluid then travels through first fluid channel 224 where it enters the internal valve cavity 217 through inlet port 226 where the temperature of the fluid is "sensed" by the thermal actuator (or temperature responsive actuator) 66. During automobile start-up conditions, for example, the transmission oil is "cold" and has not reached its optimal operating temperature and, therefore, does not require "cooling". Therefore, at this stage, the valve mechanism or thermal actuator 66 is in its "closed" or bypass position (i.e. cold condition shown in FIG. 9) with valve disk 71 being spaced away from valve seat 219 thereby fluidly connecting the first and second fluid channels 224, 228 through a portion of the internal valve cavity 217, while valve disk 73 is sealed against valve seat 241 thereby preventing fluid from entering heat exchanger 212. Accordingly, rather than having the fluid flow through heat exchanger 212, the fluid bypasses heat exchanger 212 and is directed back to the transmission through outlet port 222. As the temperature of the first heat exchange fluid, i.e. transmission oil, increases, the thermal or temperature responsive actuator 66 is activated by means of expansion of the material/wax within the actuator (or by activation of a solenoid coil, for example, when an electronic solenoid valve mechanism is used) thereby causing the second valve disk 73 to move away from valve seat 241 and valve disk 71 to be moved into sealing engagement against valve seat 219. Therefore, the valve mechanism moves from its closed or bypass position to its open position wherein a fluid connection is provided between the first fluid channel 224 and the third fluid channel 234 by means of a portion of the internal valve cavity 217. The first heat exchanger fluid, therefore, enters the heat exchanger assembly 200 through inlet port 220, flows through fluid channel 224 and enters the internal valve cavity 217 via inlet port 226. The fluid then flows though the internal valve cavity 217 and enters the third fluid channel 234 through outlet port 236 where it travels through the third fluid channel 234 and is directed to the oil inlet manifold of heat exchanger 212. The oil flows through the heat exchanger 212 and is directed back to the transmission through the branch portion 229 of the second fluid channel 228 and out of the heat exchanger assembly 200 through outlet port 222.

While the present invention has been illustrated and described with reference to specific exemplary embodiments of heat exchanger assemblies comprising a heat exchanger with an integrated valve structure or valve integration unit, it is to be understood that the present invention is not limited to the details shown herein since it will be understood that various omissions, modifications, substitutions and changes in the forms and details of the disclosed system and their operation may be made by those skilled in the art without departing, in any way from the spirit and scope of the present invention. For instance, while heat exchanger assemblies 10, 100 and 200 have been described with in connection with particular applications for cooling/heating transmission oil, it will be understood that any of the heat exchanger assemblies described herein can be used for various other heat exchange applications and should not be limited to applications associated with the transmission of an automobile system.

What is claimed is:

1. A heat exchanger assembly comprising:
a heat exchanger having alternating first and second fluid passages in heat exchange relation;
a first inlet manifold and a first outlet manifold interconnected by the first fluid passages for the flow of a first heat exchange fluid through the heat exchanger; and
a second inlet manifold and a second outlet manifold interconnected by the second fluid passages for the flow of a second heat exchange fluid through the heat exchanger;
a manifold structure fixedly attached to the heat exchanger and in fluid communication with the first inlet and outlet manifolds of the heat exchanger, the manifold structure comprising:
a first internal fluid channel for directing the first heat exchange fluid to the first inlet manifold of said heat exchanger;
a second internal fluid channel for directing the first heat exchange fluid away from said first inlet manifold of said heat exchanger;
an internal valve cavity in fluid communication with the first outlet manifold of said heat exchanger and the second internal fluid channel;
a valve mechanism disposed within the internal valve cavity for controlling flow of the first heat exchange fluid to either said heat exchanger or to said second internal fluid channel; and
a first pair of inlet and outlet ports for receiving the first heat exchange fluid from a source and returning said first heat exchange fluid to said source;
a second pair of inlet and outlet ports in fluid communication with the corresponding, respective first inlet and outlet manifolds in said heat exchanger; and
a third pair of inlet and outlet ports for directing said first heat exchange fluid out of said manifold structure and returning said first heat exchange fluid to said manifold structure;
wherein the first internal fluid channel interconnects said first inlet port and said first inlet manifold of said heat exchanger, and the second internal fluid channel interconnects said first inlet port and said third outlet port; and
wherein the manifold structure further comprises a third internal fluid channel which interconnects said third inlet port and said first outlet port via said internal valve cavity.

2. The heat exchanger assembly of claim 1, wherein the second internal fluid channel is adapted for fluid communication with a second heat exchanger.

3. The heat exchanger assembly of claim 1, wherein said third pair of inlet and outlet ports are adapted for fluid communication with corresponding inlet and outlet ports of a second heat exchanger disposed remotely with respect to said heat exchanger assembly.

4. The heat exchanger assembly of claim 3, wherein the heat exchanger is adapted to function as a warmer and wherein the second heat exchanger functions as a cooler.

5. The heat exchanger assembly of claim 3, wherein the heat exchanger is an oil-to-water heat exchanger and wherein the second heat exchanger is an oil-to-air heat exchanger.

6. The heat exchanger assembly of claim 1, wherein the manifold structure has a first side in face-to-face contact and mounted to a base plate of the heat exchanger;
wherein the first side of the manifold structure is provided with said second pair of inlet and outlet ports; and
wherein the second inlet port of the manifold structure is in fluid communication with the first inlet manifold of the heat exchanger, and the second outlet port of the manifold structure is in fluid communication with the first outlet manifold of the heat exchanger.

7. The heat exchanger assembly of claim 6, wherein the manifold structure has a second side which is opposite to the first side, and which faces away from the heat exchanger;
wherein the second side of the manifold structure is provided with said first pair of inlet and outlet ports.

8. The heat exchanger assembly of claim 1, wherein the first internal fluid channel is formed within the manifold structure and is in fluid communication with the first inlet port for receiving the first heat exchange fluid from the source.

9. The heat exchanger assembly of claim 8, wherein the first internal fluid channel is also in fluid communication with the second outlet port which is adapted to direct the first heat exchange fluid entering the manifold structure to the heat exchanger.

10. The heat exchanger assembly of claim 1, wherein the second internal fluid channel branches away from the first internal fluid channel and is adapted to direct the first heat exchange fluid from the first inlet port, through the manifold structure, and out of the manifold structure through the third outlet port.

11. The heat exchanger assembly of claim 1, wherein the valve mechanism includes a valve disk or spool-type valve member coupled to a thermal actuator, and the thermal actuator is responsive to temperature of the heat exchange fluid entering the internal valve cavity and being returned to said source.

12. The heat exchanger assembly of claim 1, wherein the valve mechanism is moveable between a first valve position permitting fluid flow to said heat exchanger, and a second valve position preventing fluid flow to said heat exchanger.

13. The heat exchanger assembly of claim 1, wherein the valve mechanism comprises a thermal actuator in the form of a wax motor; and
wherein the thermal actuator includes an actuator piston moveable from a first position to a second position by means of expansion of wax contained in the thermal actuator which expands in response to an increase in temperature of the first heat exchange fluid entering the internal valve cavity.

14. The heat exchanger assembly of claim 13, wherein, with the actuator piston in the first position, the first heat exchange fluid entering the manifold structure is directed to the heat exchanger; and
with the actuator piston in the second position, the first heat exchange fluid entering the manifold structure through the first inlet port is directed through the second internal fluid channel toward the third outlet port.

15. The heat exchanger assembly of claim 1, wherein the internal valve cavity serves as a valve chamber for receiving the valve mechanism.

16. The heat exchanger assembly of claim 1, wherein the internal valve cavity has:
a first inlet port for receiving the first heat exchange fluid exiting the heat exchanger and entering the manifold structure through the second inlet port;
a second inlet port for receiving the first heat exchange fluid returned to the manifold structure through the third inlet port; and
an outlet port in fluid communication with the first outlet port.

17. The heat exchanger assembly of claim 1, wherein the valve mechanism comprises a thermal actuator in the form of a wax motor;
wherein the valve mechanism includes a valve cap having a first end which seals an end of the valve cavity, and a second end which seats against one end of the thermal actuator; and
wherein the second end of the valve cap is provided with openings therethrough to allow fluid entering the internal valve cavity through the third inlet port to pass through the second end of the valve cap to the first outlet port.

18. A thermal management unit for a vehicle transmission, the thermal management unit comprising:
a manifold structure having an internal valve cavity, the manifold structure having first inlet and outlet ports, second inlet and outlet ports, and third inlet and outlet ports, wherein the respective first inlet and outlet ports are adapted for receiving transmission oil from the transmission and returning the transmission oil to the transmission;
a valve mechanism disposed within the internal valve cavity and comprising a temperature responsive actuator;
a heat exchanger integrated with the manifold structure, the heat exchanger having a plurality of alternating first and second fluid passages, first inlet and outlet manifolds interconnected by the first fluid passages, and second inlet and outlet manifolds interconnected by the second fluid passages, wherein the first fluid passages are adapted for flow of the transmission oil and the second fluid passages are adapted for flow of a liquid for heating the transmission oil, and wherein the respective second inlet and outlet ports of the manifold structure are in fluid communication with the first outlet manifold and the first inlet manifold of the heat exchanger;
wherein the respective third inlet and outlet ports are adapted to receive the transmission oil from another heat exchanger component and return the transmission oil to the other heat exchanger component;
wherein said valve mechanism has first position wherein a first portion of the transmission oil entering the manifold structure through the first inlet port is directed to the heat exchanger through the second outlet port, and a second portion of the transmission oil is directed to the other heat exchanger component through the third outlet port; and
wherein said valve mechanism has a second position wherein the thermal actuator is activated in response to an increase in the temperature of the transmission oil entering the internal valve cavity, and in which all the transmission oil entering the manifold structure through the first inlet port is directed to the other heat exchanger component through the third outlet port.

19. The thermal management system of claim 18, wherein the manifold structure has a first internal fluid channel in fluid communication with the first inlet port and the second outlet port, and a second internal fluid channel which branches away from the first internal fluid channel and is adapted to direct the transmission oil from the first inlet port to the third outlet port.

20. The thermal management system of claim 18, wherein the valve cavity has a first inlet adapted to receive the transmission oil from the second inlet port of the manifold structure; a second inlet adapted to receive the transmission oil from the third inlet port of the manifold structure; and an outlet adapted to return the transmission oil to the transmission through the first outlet port of the manifold structure.

21. The thermal management system of claim 18, wherein the valve mechanism is adapted to remain in the first position while the transmission oil returned to the manifold structure and entering the internal valve cavity is within a low temperature range.

22. The thermal management system of claim 18, wherein the valve mechanism is adapted to remain in the second position while the thermal actuator remains in an activated state.

* * * * *